Dec. 30, 1924.
W. FAUSTMANN
WATCHMAKER'S LOUPE
Filed March 2, 1923
1,521,151
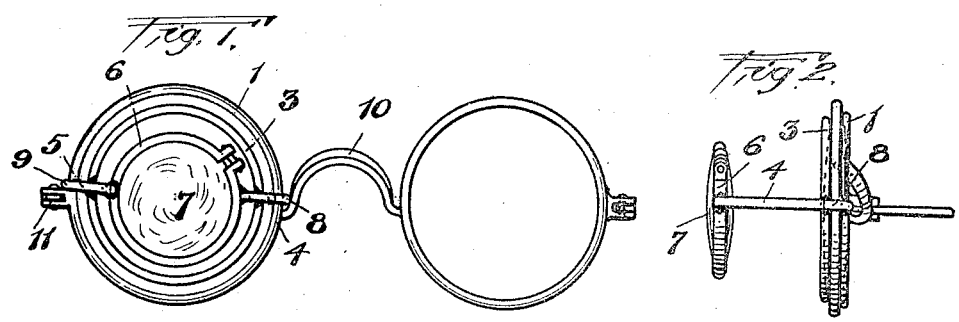
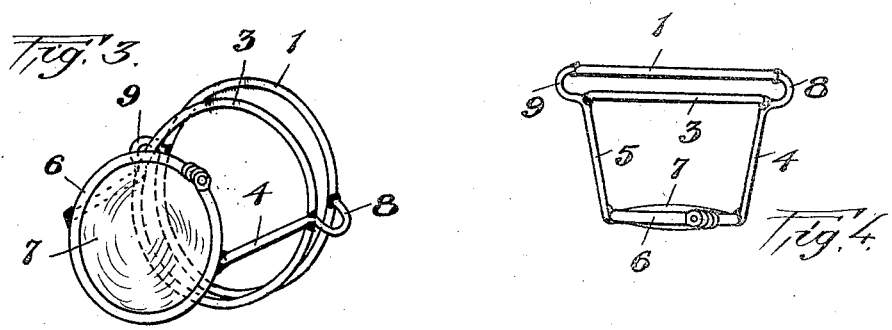
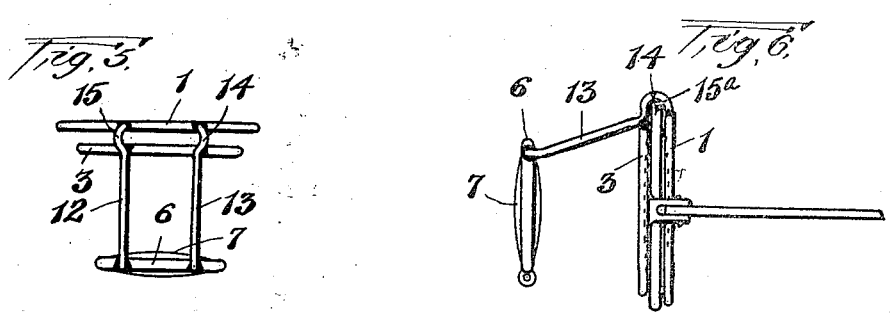
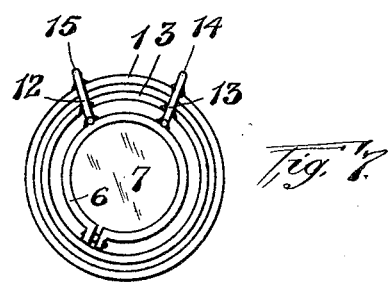
INVENTOR
William Faustmann
BY
his ATTORNEY Patented Dec. 30, 1924.

1,521,151

UNITED STATES PATENT OFFICE.

WILLIAM FAUSTMANN, OF BROOKLYN, NEW YORK, ASSIGNOR TO HAMMEL, RIG-LANDER & CO., OF NEW YORK, N. Y., A CORPORATION OF NEW YORK.

WATCHMAKER'S LOUPE.

Application filed March 2, 1923. Serial No. 622,425.

*To all whom it may concern:*

Be it known that I, WILLIAM FAUSTMANN, a citizen of the United States, and a resident of the city of New York, borough of Brooklyn, county of Kings, and State of New York, have invented a new and useful Improvement in Watchmakers' Loupes, of which the following is a specification.

This invention relates to a watchmaker's loupe which is particularly adapted for use by persons wearing eye glasses and is so constructed to enable it to be used in conjunction with the eye glasses normally worn by the person using the same.

A further object of this invention is to provide a watchmaker's loupe which can be very readily attached to the eye glass or spectacle frame and removed therefrom.

With these objects and other objects which may hereinafter appear in view, I have devised the particular arrangement of parts hereinafter set forth and more particularly pointed out in the claim appended hereto.

Reference is to be had to the accompanying drawing forming a part hereof, in which—

Figure 1 is a front elevation of a pair of eye glasses or spectacles showing my improved loupe attached to the same.

Figure 2 is a side elevation of the same.

Figure 3 is a perspective view of my improved loupe.

Figure 4 is a plan view of the same.

Figure 5 is a plan view of a modified form of loupe.

Figure 6 is a side elevation of a pair of spectacles provided with the form of loupe shown in Figure 5, and Figure 7 is a front elevation of the form of loupe disclosed in Figures 5 and 6.

Throughout the various views of the drawings, similar reference characters designate similar parts.

In the preferred embodiment of my invention as disclosed in Figures 1 to 4 inclusive, 1 indicates an annular ring of wire which is adapted to lie on the inner side of a spectacle rim as shown in Figure 2.

A short distance away from the ring 1 is disclosed a similar ring 3 preferably of smaller diameter than the ring 1. The ring 3 is intended to lie on the outer side of the spectacle lens frame and the ring 1 is adapted to lie on the opposite or inner side of the spectacle lens frame.

Located diametrically opposite one another and adapted to connect the two rings 1 and 3 together, are braces 4 and 5 which extend forward and have their outer ends secured to a lens frame 6 which holds the loupe magnifying lens 7.

Those portions of the braces 4 and 5 which are located between the rings 1 and 3 are bent outwardly as at 8 and 9 to provide a portion which rests upon the nose piece or bridge 10 of the spectacles and a portion which rests upon the hinge 11 of the spectacles as disclosed in Figures 1 and 2.

These outwardly bent portions 8 and 9 permit one of the lenses of the spectacles to be readily slipped between the two rings 1 and 3 and permit the magnifying lens 7 of the loupe to be centrally positioned with respect to the spectacle lens.

A modified form of construction is disclosed in Figures 5 to 7 inclusive wherein struts or braces 12 and 13 are shown, which instead of being placed diametrically opposite one another are positioned but a short distance away from one another.

These braces are provided with the outwardly bent portions 14 and 15, which rest on top of the edge of the spectacle lens frame 15$^a$, when the loupe is dropped over the spectacle lens frame and held as disclosed in Figure 6.

The outwardly bent portions 14 and 15 located between the rings 1 and 3 in this embodiment of the invention hold the loupe magnifying lens 7 centrally located with respect to the spectacle lens.

The loupe can if desired, be used without spectacles in the ordinary way and it will be apparent from its construction that it can be readily attached to and detached from a spectacle very quickly.

From the foregoing, it is obvious that my invention is not to be restricted to the exact embodiment shown, but is broad enough to cover all structures coming within the scope of the annexed claim.

What I claim is:

An article of the class described comprising a pair of spaced apart rings adapted to lie on opposite sides of a spectacle rim, said rings being smaller in diameter than said rim, a lens frame located at a distance from said rings, struts secured to said lens frame and connecting said lens frame with said rings, said struts having outwardly bowed portions located between the rings and adapted to rest on the edge of the spectacle rim to hold the lens centrally located with respect to said spectacle rim.

Signed at the city, county and State of New York, this 28th day of February, 1923.

WM. FAUSTMANN.

Witnesses:
GEORGE E. SANDS,
LEONARD KOHN.